(12) United States Patent
Galea

(10) Patent No.: US 6,914,205 B2
(45) Date of Patent: Jul. 5, 2005

(54) OPERATING SWITCH FOR A MOTOR VEHICLE WITH A MOVABLE PROTECTIVE DEVICE

(75) Inventor: Alexander Galea, Dingli (MT)

(73) Assignee: Methode Electronics Malta Ltd., Mriehel (MT)

( * ) Notice: Subject to any disclaimer, the term of this patent is extended or adjusted under 35 U.S.C. 154(b) by 0 days.

(21) Appl. No.: 10/368,007

(22) Filed: Feb. 19, 2003

(65) Prior Publication Data

US 2004/0016629 A1 Jan. 29, 2004

(30) Foreign Application Priority Data

Feb. 19, 2002 (DE) .................................. 102 06 939

(51) Int. Cl.[7] .............................................. H01H 9/29
(52) U.S. Cl. ............................ 200/43.01; 200/43.16; 200/43.19; 200/50.1; 200/333
(58) Field of Search .......................... 200/43.01–43.22, 200/50.1, 333

(56) References Cited

U.S. PATENT DOCUMENTS

| | | | | |
|---|---|---|---|---|
| 4,394,552 A | | 7/1983 | Schlosser ................. | 200/61.62 |
| 4,604,605 A | * | 8/1986 | Meyers et al. ................. | 341/34 |
| 4,638,129 A | * | 1/1987 | Partus et al. .............. | 200/43.22 |
| 4,713,509 A | * | 12/1987 | Chebowski .............. | 200/318.1 |
| 5,558,209 A | * | 9/1996 | Mohsen .................... | 200/43.22 |
| 5,949,039 A | * | 9/1999 | Koek et al. ................. | 200/50.1 |
| 6,329,616 B1 | * | 12/2001 | Lee .......................... | 200/51.03 |
| 6,495,775 B2 | * | 12/2002 | Lawson et al. .......... | 200/50.28 |

FOREIGN PATENT DOCUMENTS

| | | |
|---|---|---|
| DE | 1 889 538 | 8/1966 |
| DE | 42 36 516 | 5/1994 |
| DE | 199 41 952 | 3/2001 |

* cited by examiner

Primary Examiner—Kyung Lee
(74) Attorney, Agent, or Firm—Jacobson Holman PLLC

(57) ABSTRACT

An operating switch for a motor vehicle with a housing having an operating opening for accessing an operating element, and a protective device movable relative to the operating opening for temporarily covering the operating element on the operating side. The protective device is formed as a slide member guided in the housing, displaceable at right angles to the access direction of the operating opening, the slide member and the operating element being pivotable together so that the slide member is movable from a first position, in which the operating element is arranged in the operating opening, to a second position in which the operating element is covered within the housing and the operating opening is closed by the slide member.

20 Claims, 2 Drawing Sheets

OPERATING SWITCH FOR A MOTOR VEHICLE WITH A MOVABLE PROTECTIVE DEVICE

BACKGROUND OF THE INVENTION

1. Field of the Invention

This invention relates to an operating switch for a motor vehicle with a housing and a protective device movable relative to an operating element of the operating switch for temporarily covering the operating element on the operating side.

2. Description of the Related Art

Such a switch is known e.g. from U.S. Pat. No. 4,394,552 A according to which an operating switch is protected from accidental actuation by a flip cover. Such a flip cover protruding from a control panel is unsuitable for a motor vehicle if only for aesthetic reasons but also because of the risk of injury for the passengers.

At present it is usual to provide automobiles with an electronic immobilizer which can be released by an electronic key working on the transponder principle. This makes it possible to reduce the mechanical security effort for the starter switch, which can now be formed e.g. as a separate, readily accessible pushbutton switch.

The invention is based on the problem of impeding accidental actuation of such a switch and reducing the risk of injury while heeding aesthetic aspects.

SUMMARY OF THE INVENTION

This problem is solved by the an operating switch for a motor vehicle with a housing and a protective device movable relative to an operating element of the operating switch for temporarily covering the operating element on the operating side. The housing has an operating-side operating opening for the operating element, and the protective device is formed as a slide member guided in the housing and displaceable at right angles to the access direction for closing the operating opening. The slide member can now be displaced just under the operating opening and fully integrated into the switch housing. The latter can be provided with a stable bearing and/or guidance for the slide member, thereby protecting the parts from damage or destruction by force. The slide member can be fixed in the two end positions more easily than a flip member.

The motion of the slide member may be effected or blocked by an electric drive, controllable by means of an identification key, which makes it possible to close the operating opening tightly until the key is coupled. The slide can then be controlled in dependence on the working condition of the engine in order to prevent actuation of the starter button with the engine running.

The slide member may be formed as a wall-like slide for closing the operating opening in the manner of a movable screen. The operating button of the switch therebelow is movable only in the press-in direction.

The slide may be curved in the sliding direction and guided in an accordingly curved slideway of the housing, and may be guided so as to be largely sinkable in the housing. This construction constitutes a rotary valve which requires little room for movement and permits an accordingly narrow construction of the switch.

The operating element of the operating switch may be tart of a switch unit mounted movably in the housing and forming the slide member, being displaceable out of the area of the operating opening behind stationary wall members of the housing. Hence, the switch unit is an integral part of the slide member with the accordingly integrally formed wall members. In particular, the switch unit may be pivotally mounted in the housing, with a swivel axis of the switch unit being disposed on the side of the switch unit facing away from the operating opening. So constructed, it is possible to make the operating element pass slightly out of the switch housing in the open position, thereby improving accessibility. The switch unit may also have a wall segment for closing the operating opening in the sunk position of the operating element.

The operating switch may also be equipped with additional electric switching elements actuated by the motion of the particular displaceable part, which makes it possible to wire further circuits in addition to the main circuit of the operating switch in expedient dependence on the slide position.

An example of the invention is shown in the drawing and will be explained in more detail in the following.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
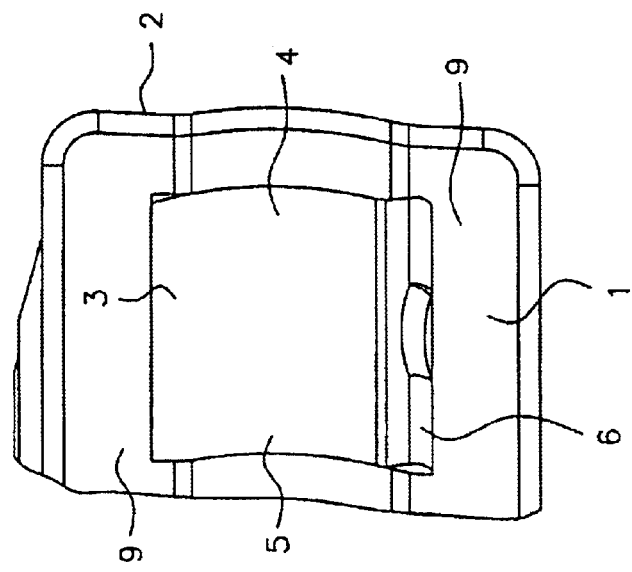
FIG. 1 shows a perspective, operating-side view of an operating switch with a slide member in a closed position.

According to FIG. 1, housing 1 of operating switch 2 is provided with front-side operating opening 3 which is closed here by wall segment 4 of slide member 5 pivotally mounted in housing 1 and provided with rib-like outwardly protruding elevation 6 for manual actuation of slide member 5. Elevation 6 furthermore forms an end stop for the motion of slide member 5 on lateral wall members 9 of housing 1 limiting the operating opening.

Figure 2:
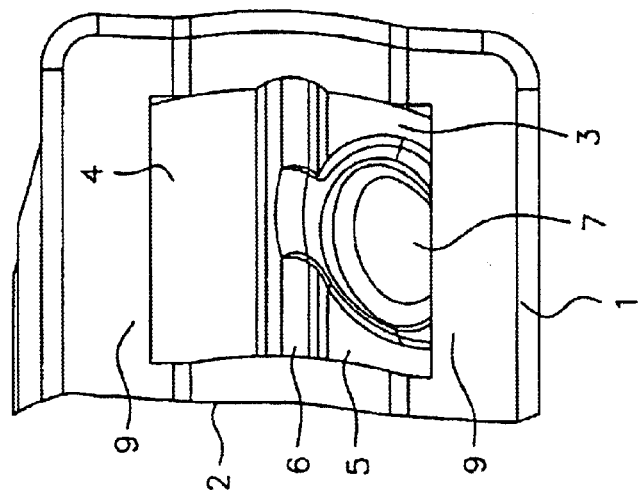
FIG. 2 shows the operating switch according to FIG. 1 in a partially open position of the slide member.

According to FIG. 2, slide member 5 is rotated approximately half the length of operating opening 3, whereby button-like operating element 7 of switch unit a integrated in slide member 5 (FIG. 4) has passed from a covered position under lateral wall members 9 of housing 1 partly into the area of operating opening 3, and wall segment 4 has swiveled under opposite lateral wall members 9.

Figure 3:
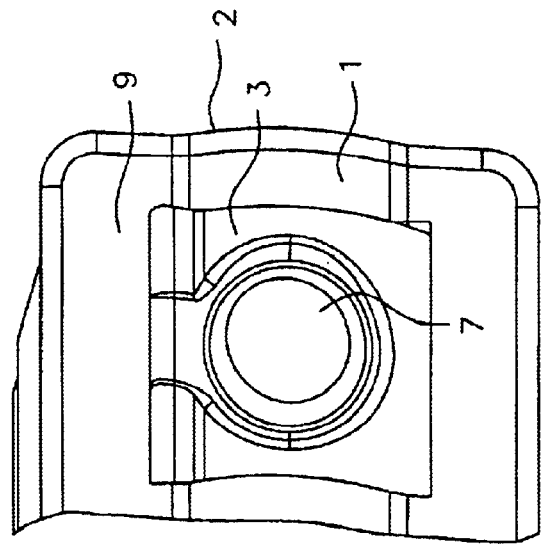
FIG. 3 shows the operating switch according to FIG. 1 in an open position of the slide member.

According to FIG. 3, slide member 5 has been swiveled further with operating element 7 into its end position in which the operating element is completely in the area of the operating opening and fully accessible for manual actuation.

Figure 4:
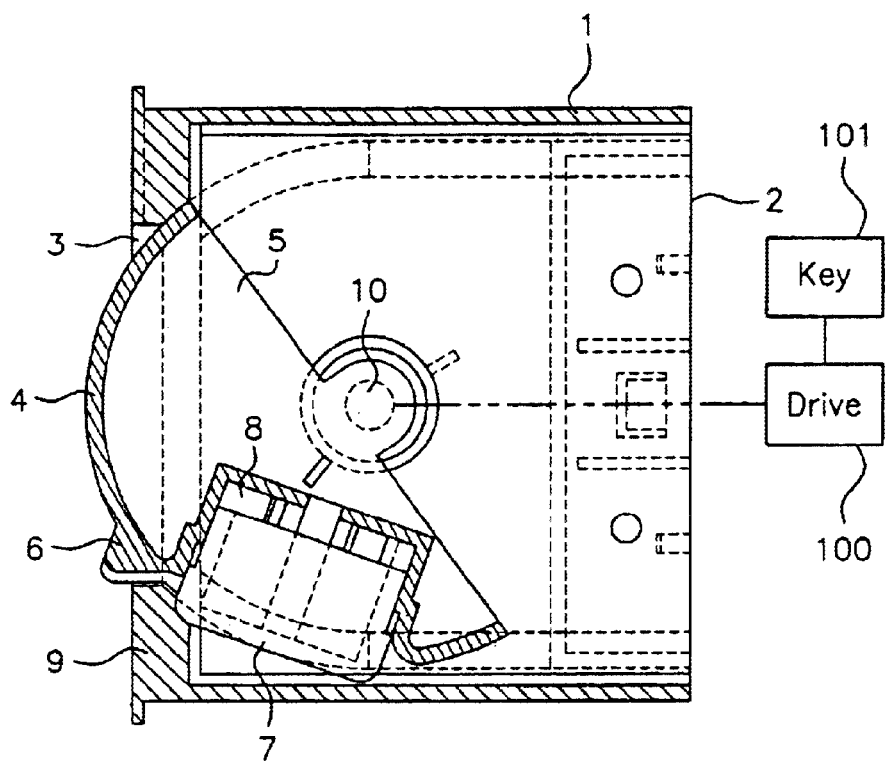
FIG. 4 shows a section through the operating switch according to FIG. 1.

FIG. 4 shows the internal structure of the operating switch in the position of slide member 5 according to FIG. 1. The latter forms an approximately semicircular segment which swivels around rotation axis 10 of housing 1. In said segment, switch unit 8 is integrated with outwardly pointing operating element 7, which is completely covered here by wall members 9 of housing 1 and thus inaccessible for actuation. Operating opening 3 is completely closed by wall segment 4 of slide member 5. The motion of the slide member may be effected or blocked by an electric drive 100, controllable by means of an identification key 101, which makes it possible to close the operating opening until the key is coupled. The slide can then be controlled in dependence on the working condition of the engine in order to prevent actuation of the starter button with the engine running.

Figure 5:
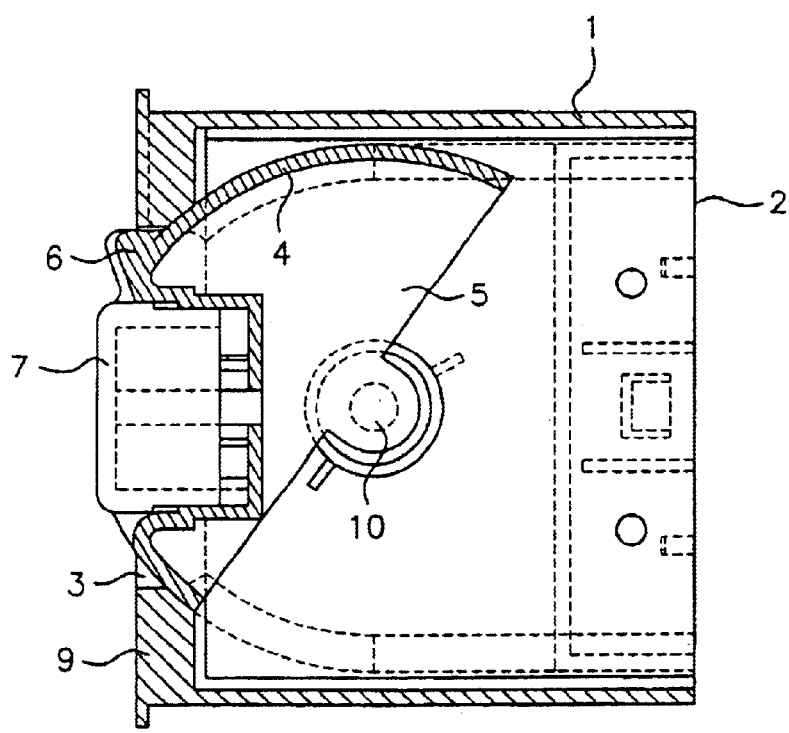
FIG. 5 shows a section through the operating switch according to FIG. 3.

According to FIG. 5, elide member 5 has swiveled into the end position shown in FIG. 3 in which operating element 7 protrudes slightly out of operating opening 3 and is thus fully accessible. Pressing pushbutton-like operating element 7 actuates a contact of the switch unit, thereby switching on e.g. a starter for the engine of the motor vehicle.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. An operating switch for a motor vehicle comprising a housing having an operating opening providing access to an operating element of the operating switch, and a slide member for temporarily covering the operating opening, said slide member being guided in the housing and displaceable substantially at right angles to the access direction of the operating opening, said slide member and said operating element being pivotable together so that said slide member is movable from a first position, in which the operating element is arranged in the operating opening, to a second position in which the operating element is covered within the housing and the operating opening is closed by the slide member.

2. The operating switch according to claim 1, wherein the motion of the slide member can be effected or blocked by an electric drive coupled thereto.

3. The operating switch according to claim 2, wherein the drive is controllable by means of an identification key coupled thereto.

4. The operating switch according to claim 1, wherein the slide member is formed as a wall-like slide for closing the operating opening.

5. The operating switch according to claim 4, wherein the slide member is curved in the sliding direction and guided in an accordingly curved slideway of the housing.

6. The operating switch according to claim 5, wherein the slide member is guided so as to be largely sinkable in the housing.

7. The operating switch according to claim 1, wherein the operating element is part of a switch unit mounted movably in the housing and forming the slide member, and is displaceable out of the area of the operating opening behind stationary wall members of the housing.

8. The operating switch according to claim 7, wherein the switch unit is pivotally mounted in the housing, and a swivel axis of the switch unit is disposed on a side of the switch unit facing away from the operating opening.

9. The operating switch according to claim 7, wherein the protective device has a wall segment for closing the operating opening in a sunk position of the operating element.

10. The operating switch according to claim 1, wherein the operating switch is equipped with additional electric switching elements which are actuated by the motion of a particular displaceable part.

11. An operating switch for a motor vehicle comprising a housing having an operating opening for providing access to an operating element, and a slide member pivotally mounted in said housing for temporarily covering the operating opening, said operating element being part of a switch unit mounted movably in the housing and coupled to the slide member such that movement of said slide member displaces said operating element from the operating opening to a position behind stationary wall members of the housing in which the operating opening is closed by the slide member.

12. The operating switch according to claim 11, wherein the slide member is formed as a wall-like slide for closing the operating opening.

13. The operating switch according to claim 12, wherein the slide is curved in the sliding direction and guided in an accordingly curved slideway of the housing.

14. The operating switch according to claim 13, wherein the slide is guided so as to be largely sinkable in the housing.

15. The operating switch according to claim 11, wherein the switch unit is pivotally mounted in the housing, and a swivel axis of the switch unit is disposed on a side of the switch unit facing away from the operating opening.

16. An operating switch for a motor vehicle comprising a housing having an operating opening for providing access to an operating element of the operating switch, and a protective device movable relative to the operating opening for temporarily covering the operating element on an operating side, said protective device being formed as a slide member curved in the sliding direction and guided in an accordingly curved slideway of the housing, said slide member being displaceable at substantially right angles to the access direction to the operating element for closing the operating opening.

17. The operating switch according to claim 16, wherein the slide is guided so as to be largely sinkable in the housing.

18. The operating switch according to claim 16, wherein the operating element is part of a switch unit mounted movably in the housing and forming the slide member, and is displaceable out of the area of the operating opening behind stationary wall members of the housing.

19. The operating switch according to claim 18, wherein the switch unit is pivotally mounted in the housing, and a swivel axis of the switch unit is disposed on a side of the switch unit facing away from the operating opening.

20. The operating switch according to claim 16, wherein the protective device has a wall segment for closing the operating opening in a sunk position of the operating element.

* * * * *